(12) United States Patent
Strater et al.

(10) Patent No.: US 10,542,486 B1
(45) Date of Patent: Jan. 21, 2020

(54) METHOD AND SYSTEM FOR MULTI-MAP CONTROLLER DISCOVERY AND RESOLUTION

(71) Applicant: ARRIS Enterprises LLC, Suwanee, GA (US)

(72) Inventors: Jay Strater, San Diego, CA (US); Gregory Nakanishi, San Diego, CA (US); Xi Chen, San Diego, CA (US); Kurt Alan Lumbatis, Dacula, GA (US)

(73) Assignee: ARRIS Enterprises, LLC, Suwanee, GA (US)

( * ) Notice: Subject to any disclaimer, the term of this patent is extended or adjusted under 35 U.S.C. 154(b) by 0 days.

(21) Appl. No.: 16/229,110

(22) Filed: Dec. 21, 2018

(51) Int. Cl.
*H04W 48/16* (2009.01)
*H04W 84/20* (2009.01)
*H04W 84/12* (2009.01)
*H04W 88/12* (2009.01)

(52) U.S. Cl.
CPC .......... *H04W 48/16* (2013.01); *H04W 84/20* (2013.01); *H04W 84/12* (2013.01); *H04W 88/12* (2013.01)

(58) Field of Classification Search
CPC ..... H04W 84/12; H04W 84/20; H04W 36/10; H04W 88/08; H04W 88/12; H04W 92/20
See application file for complete search history.

(56) References Cited

U.S. PATENT DOCUMENTS 9,408,249 B2 * 8/2016 Pang .................... H04W 84/12

OTHER PUBLICATIONS

The Broadband Forum, "CPE WAN Management Protocol". Technical Report TR-069, Issue 1, Amendment 6. Mar. 2018.
Wi-Fi Alliance, "Wi-Fi CERTIFIED EasyMesh™ Technology Overview". May 2018.

* cited by examiner

*Primary Examiner* — Nam T Huynh
(74) *Attorney, Agent, or Firm* — Stewart M. Wiener

(57) ABSTRACT

A method for discovering and resolving a new multiple access point (MAP) controller by an existing MAP controller in a wireless network, comprising collecting, by a high-level controller (HLC) of a device comprising the existing MAP controller, network topology information of the wireless network from the existing MAP controller, determining, by the HLC, that the new MAP controller is connected to the wireless network, and disabling, by the HLC in response to determining that the new MAP controller is connected to the wireless network, the existing MAP controller.

20 Claims, 5 Drawing Sheets

FIG. 3

- 302 HLC START
- 304 Enable MAP Agent in Device
- 306 Device Configured for MAP Controller Operation?
- 308 New Configuration Received for Device MAP Controller
- 310 Enable MAP Controller
- 312 Collect Topology Information from MAP Controller
- 313 Loss of a MAP Controller Detected?
- 314 MAP Controller Elsewhere in Network?
- 316 Disable MAP Controller in Local Device
- 318 Report Other MAP Controller
- 320 Collect Topology Information from MAP Agent
- 322 MAP Controller Elsewhere in Network?
- 324 Re-Enable MAP Controller in Device
- 326 Report MAP Controller Change
- 328 Stop Collecting Topology Information from MAP Agent

300

METHOD AND SYSTEM FOR MULTI-MAP CONTROLLER DISCOVERY AND RESOLUTION

FIELD

The present disclosure relates to resolving control of a multiple access point network, specifically discovering and resolving a new multiple access point controller by a device including an existing multiple access point controller.

BACKGROUND

Home networks, such as wireless networks, include residential gateways and various access points, such as wireless extenders. The networks may often include controllers, typically in the residential gateway. When present, a controller may discover other access points in the network and configure them with common service set identifier (SSID) and security credentials to be part of an IEEE 802.11 Extended Service Set (ESS). A controller may also steer 802.11 stations (e.g., clients) to be associated with different network radios/access points in their network ESS as needed.

Similarly, multiple access point (MAP) networks include a MAP controller and multiple MAP agents. As will be apparent to persons having skill in the art, MAP is also known as EasyMesh (as referred to by the Wi-Fi Alliance), and the term EasyMesh can be used interchangeably with MAP herein. A device may include both MAP controller and MAP agent functionality. However, MAP network specifications do not allow multiple MAP (multi-MAP) controllers in a network. As a result, existing standards and functionality are not configured to perform any resolution if multiple MAP controllers are added to the same network.

As homes begin to become more inclusive in the network, adding devices such as thermostats, doorbells, refrigerators, washing and drying machines, dishwashers, showers, alarms, locks, and more, users are searching for full network coverage in their homes with easy network extension as required. An intuitive, or even fully automated, technical solution to home networking issues, such as conflicts arising out of multiple MAP controllers, is needed.

SUMMARY

The present disclosure provides a description of systems and methods for multi-MAP controller discovery and resolution.

The method includes collecting, by a high-level controller (HLC) of a device comprising the existing MAP controller, network topology information of the wireless network from the existing MAP controller, determining, by the HLC, that the new MAP controller is connected to the wireless network, and disabling, by the HLC in response to determining that the new MAP controller is connected to the wireless network, the existing MAP controller.

The system includes a plurality of user devices, a plurality of MAP devices electronically coupled to the plurality of user devices, an existing MAP controller disposed in at least one of the plurality of MAP devices, and a high-level controller (HLC) disposed in the at least one of the plurality of MAP devices comprising the existing MAP controller. The HLC is configured to collect network topology information of the wireless network from the existing MAP controller, determine that the new MAP controller is connected to the wireless network, and disable, in response to determining that the new MAP controller is connected to the wireless network, the existing MAP controller.

BRIEF DESCRIPTION OF THE DRAWINGS

The scope of the present disclosure is best understood from the following detailed description of exemplary embodiments when read in conjunction with the accompanying drawings. Included in the drawings are the following figures:

FIG. 3 is a flow diagram illustrating a process for multi-MAP controller discovery and resolution executed by the high-level controller of FIG. 1 in accordance with exemplary embodiments.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Multi-MAP Controller Discovery and Resolution

Figure 1:
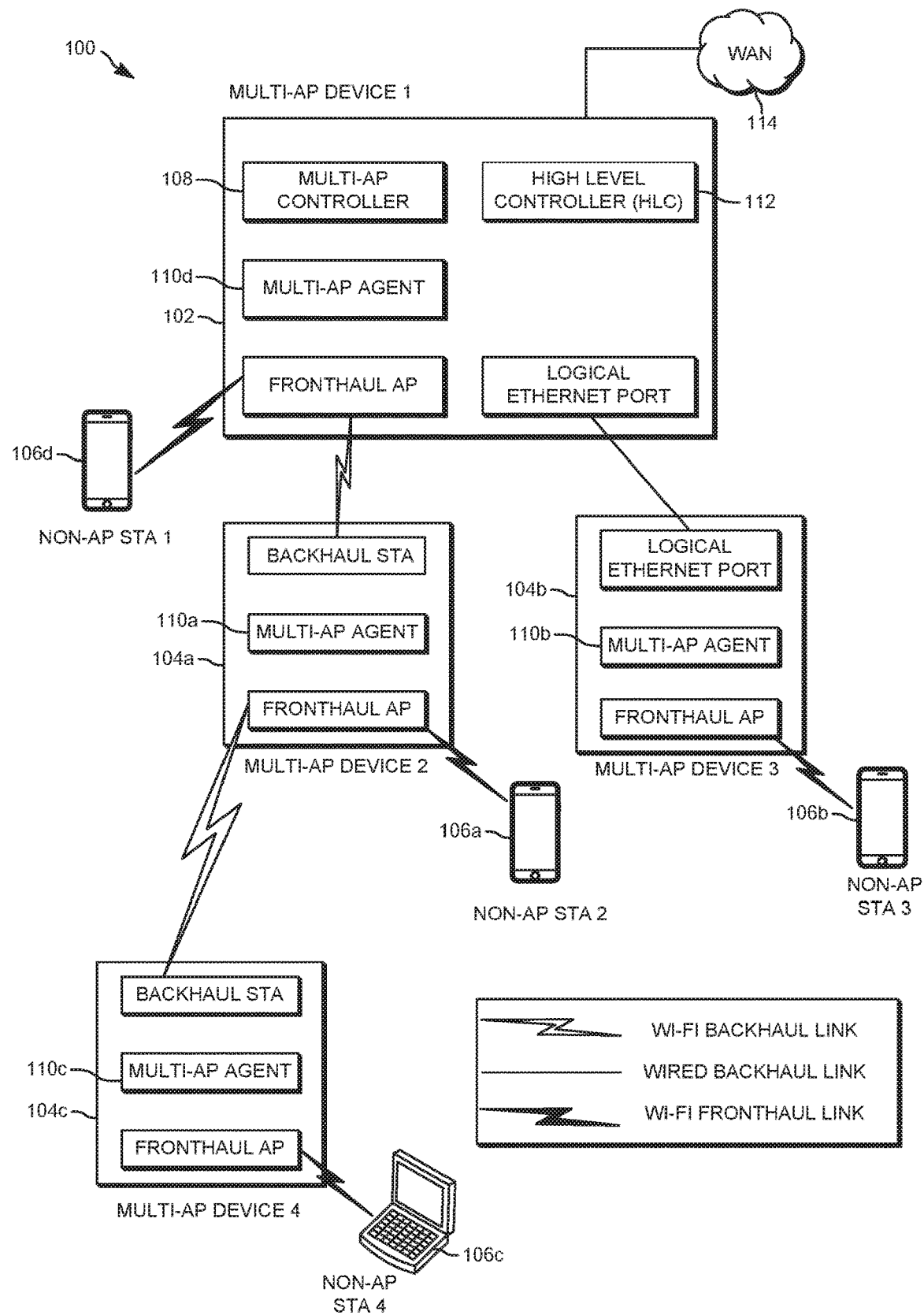
FIG. 1 is a block diagram illustrating a high-level system architecture for multi-MAP controller discovery and resolution in accordance with exemplary embodiments.

Referring now to FIG. 1, a system 100 for multi-MAP controller discovery and resolution in a wireless network is discussed further. The system 100 may include a device comprising an existing MAP controller (existing MAP controller device) 102 and a plurality of MAP devices 104a-104c (collectively 104).

In some embodiments, the MAP devices 104 may be connected to the wireless network through the existing MAP controller device 102, as shown by MAP devices 104a and 104b. In some embodiments, the MAP devices 104 may be connected to the wireless network through another MAP device 104a that is connected to the existing MAP controller device 102, as shown by MAP device 104c. In some embodiments, the MAP devices 104 may be connected to the existing MAP controller device 102 and/or other MAP devices 104 through a Wi-Fi backhaul link, as shown by MAP devices 104a and 104c. In some embodiments, the MAP devices 104 may be connected to the existing MAP controller device 102 and/or other MAP devices 104 through a wired backhaul link between logical Ethernet ports, as shown by MAP device 104b.

User devices 106a-106d (collectively 106) may be electronically coupled to the existing MAP controller device 102 and the MAP devices 104. In one embodiment, the user devices 106 may connect through a Wi-Fi fronthaul link.

The existing MAP controller device 102 comprises an existing MAP controller 108. The existing MAP controller device 102 and the MAP devices 104 comprise MAP agents 110a-110d (collectively 110). The existing MAP controller 108 may be configured to discover devices, including, but not limited to, MAP devices, configure the discovered devices to form an extended service set (ESS), steer clients between the ESS radios and/or access points (APs) as needed.

The existing MAP controller device 102 may also comprise a high-level controller (HLC) for driving the existing MAP controller 108. The HLC 112 may be configured to drive MAP controller configuration, channel preferences, network topology and key metrics collection, centralized steering, and more. In one embodiment, the centralized steering may comprise proprietary home network controller (HNC) steering logic. The HLC 112 may be further configured to address scenarios when multiple MAP controller devices appear in the wireless network, such as when the user connects a new MAP controller device to the wireless network in addition to the existing MAP controller device 102. The HLC 112 may discover and resolve the multiple MAP controller device (multi-MAP) scenario according to processes discussed further hereinbelow with regards to FIGS. 3 and 4.

The wireless network may be configured to connect to a wide area network (WAN), or another external network, through the existing MAP controller device 102.

Device with MAP Controller

Figure 2:
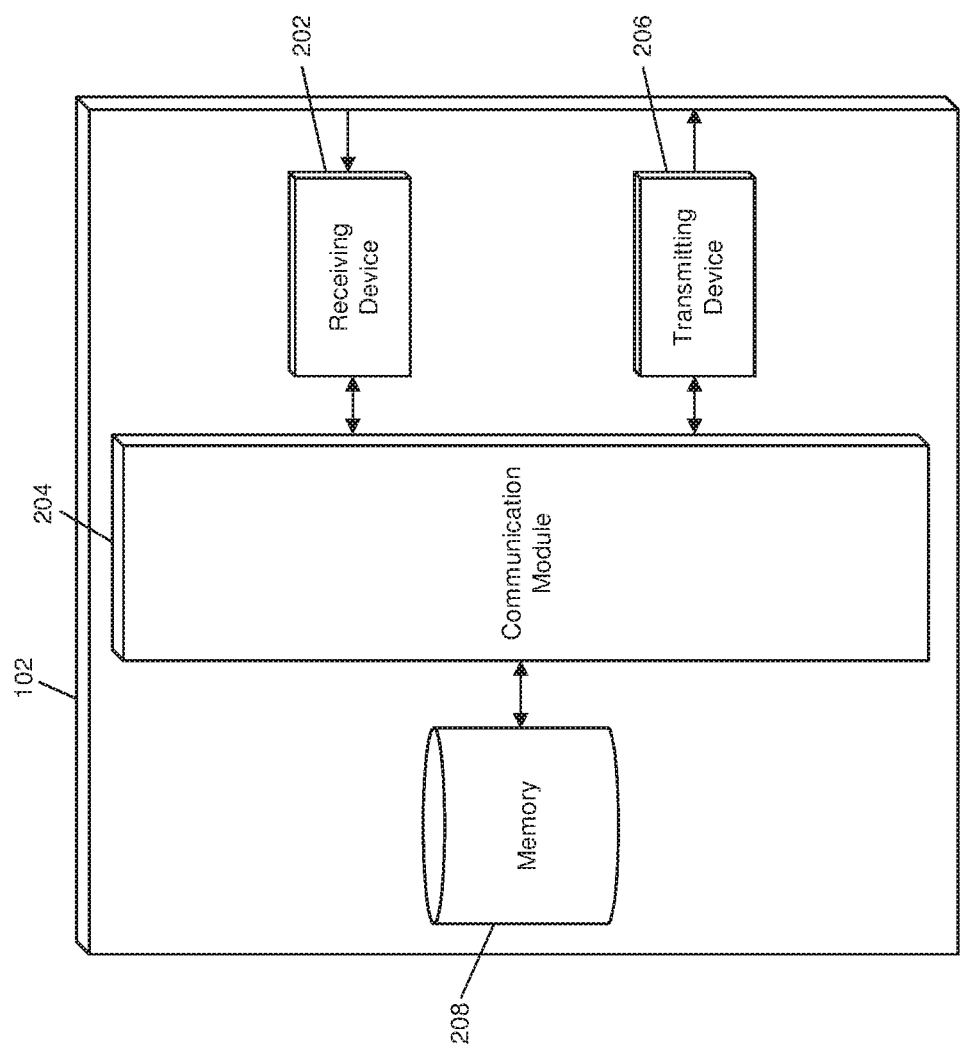
FIG. 2 is a block diagram illustrating the existing MAP controller device of the system of FIG. 1 for multi-MAP controller discovery and resolution in accordance with exemplary embodiments.

Referring now to FIG. 2, a block diagram illustrating the existing MAP controller device 102 of the system of FIG. 1 for multi-MAP controller discovery and resolution in a wireless network is discussed further.

It will be apparent to persons having skill in the relevant art that the embodiment of the existing MAP controller device 102 illustrated in FIG. 2 is provided as illustration only and may not be exhaustive to all possible configurations of the existing MAP controller device 102 suitable for performing the functions as discussed herein. For example, a computer system 500 illustrated in FIG. 5 and discussed in more detail hereinbelow may be a suitable configuration of the existing MAP controller device 102.

The existing MAP controller device 102 may include a receiving device 202. The receiving device 202 may be configured to receive data over one or more networks via one or more network protocols. In some instances, the receiving device 202 may be configured to receive data from user devices 106, MAP devices 108, and other systems and entities via one or more communication methods, such as radio frequency, local wireless networks, wireless networks, cellular communication networks, Bluetooth, Ethernet, backhaul links, fronthaul links, the Internet, etc. In some embodiments, the receiving device 202 may be comprised of multiple devices, such as different receiving devices for receiving data over different networks, such as a first receiving device for receiving data over a local wireless network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by MAP devices 108, a new MAP controller device, and other access points that are superimposed or otherwise encoded with information regarding backhaul packets, traffic data, channel utilization data, status information, etc. The receiving device 202 may also be configured to receive data signals electronically transmitted by user devices 106, which may be superimposed or otherwise encoded with scanned identifying data of new MAP devices, such as new MAP controller devices, and other data used in performing the functions discussed herein. In cases where the existing MAP controller device 102 is part of a router or other networking device, the receiving device 202 may also be performed to receive data signals as part of functions performed as part of the networking device, such as receiving data packets for routing within or outside of the wireless network.

The existing MAP controller device 102 may also include a communication module 204. The communication module 204 may be configured to transmit data between modules, engines, databases, memories, and other components of the existing MAP controller device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the existing MAP controller device 102 and external components of the existing MAP controller device 102, such as externally connected databases, display devices, input devices, etc. The existing MAP controller device 102 may also include a processing device. The processing device may be configured to perform the functions of the existing MAP controller device 102 discussed herein as will be apparent to persons having skill in the relevant art. In some embodiments, the processing device may include and/or be comprised of a plurality of engines and/or modules specially configured to perform one or more functions of the processing device. As used herein, the term "module" may be software executed on hardware such that it is particularly programmed to receive an input, perform one or more processes using the input, and provides an output. In one embodiment, the HLC 112 may be embedded in the processing device of the existing MAP controller device 102. In another embodiment, the HLC 112 may be external to the processing device of the existing MAP controller device 102 and configured to communicate directly to the processing device and/or via the receiving device 202.

The existing MAP controller device 102 may also include a transmitting device 206. The transmitting device 206 may be configured to transmit data over one or more networks via one or more network protocols. In some instances, the transmitting device 206 may be configured to transmit data to MAP devices 108, client devices 106, a remote management system, and other entities via one or more communication methods, local wireless networks, cellular communication, Bluetooth, radio frequency, the Internet, etc. In some embodiments, the transmitting device 206 may be comprised of multiple devices, such as different transmitting devices for transmitting data over different networks, such as a first transmitting device for transmitting data over a local wireless network and a second transmitting device for transmitting data via the Internet. The transmitting device 206 may electronically transmit data signals that have data superimposed that may be parsed by a receiving computing device. In some instances, the transmitting device 206 may include one or more modules for superimposing, encoding, or otherwise formatting data into data signals suitable for transmission.

The transmitting device 206 may be configured to electronically transmit data signals to user devices 106, MAP devices 108, and remote management servers that are superimposed or otherwise encoded with MAP data, backhaul links, and other data that may be used in discovering and resolving multi-MAP scenarios as discussed herein. The transmitting device 206 may also be configured to electronically transmit data signals to user devices 106 that are superimposed or otherwise encoded with onboarding result data.

The existing MAP controller device 102 may also include a memory 208. The memory 208 may be configured to store data for use by the existing MAP controller device 102 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the existing MAP controller device 102 in the performance of the functions disclosed herein as will be apparent to persons having skill in the relevant art. In some embodiments, the memory 208 may be comprised of or may otherwise include a relational database that utilizes structured query language for the storage, identification, modifying, updating, accessing, etc. of structured data sets stored therein. The memory 208 may be configured to store, for example, lists of connected MAP devices and lists of connected MAP controller devices for performing the functions discussed herein.

Process for Multi-MAP Controller Discovery and Resolution

Referring now to FIG. 3, a process 300 for multi-MAP controller discovery and resolution executed by the HLC 112 of FIG. 1 is discussed further. At step 302, the HLC 112 may start. At step 304, the MAP agent 110 in the existing MAP controller device 102 may be enabled. In some embodiments, the existing MAP controller device 102 may not comprise a MAP agent 110 and the process 300 may proceed from step 302 directly to step 306.

At step 306, the HLC 112 may determine if the existing MAP controller device 102 is configured for MAP controller operation. In one embodiment, the configuration may comprise at least one of a default configuration and a TR-069 setting. TR-069 (Technical Report 069) is a technical specification of the Broadband Forum that defines an application layer protocol for remote management of customer-premises equipment (CPE) connected to an Internet Protocol (IP) network. In response to determining that the existing MAP controller device 102 is not configured for MAP controller operation, the HLC 112 may proceed to step 312, discussed below. In one embodiment, at step 308, the HLC 112 may receive a new configuration for MAP controller in the existing MAP controller device 102 from a remote management server.

In response to determining that the existing MAP controller device 102 is configured for MAP controller operation at step 306, the HLC 112 may enable MAP controller in the existing MAP controller device 102 at step 310. At step 312, the HLC 112 may collect network topology information from the existing MAP controller 108. In one embodiment, the HLC 112 may collect network topology information as new information about the wireless network is discovered and/or changed. In another embodiment, the HLC 112 may proactively probe the wireless network to collect network topology information. In step 313, the HLC 112 may determine, from the collected topology information, if the MAP controller was lost (e.g., the MAP controller process was stopped, the corresponding device removed from the network, etc.). If the current MAP controller was lost, then the process 300 may return to step 310 where a different MAP controller (e.g., in the HLC 112) may be enabled.

At step 314, the HLC 112 may determine if a new MAP controller has been identified elsewhere in the wireless network. In response to the HLC 112 determining that no new MAP controller exists elsewhere in the wireless network, the process 300 may proceed to step 324, discussed below. In response to the HLC 112 determining that a new MAP controller exists elsewhere in the wireless network, the HLC 112 may disable the existing MAP controller 108 in the existing MAP controller device 102 at step 316.

In one embodiment, the new MAP controller in the wireless network may be detected from a MAP Supported-Service TLV received in a 1905.1 Topology response message, initiated by the 1905.1 management entity of the local MAP Controller of the existing MAP controller device 102, following reception of a 1905.1 Topology response message from the new MAP controller's management entity. IEEE 1905.1 is an IEEE standard which defines a network enabler for home networking supporting both wireless and wireline technologies: IEEE 802.11, IEEE 1901 (HomePlug, HD-PLC) powerline networking, IEEE 802.3 Ethernet, and Multimedia over Coax (MoCA).

In one embodiment, at step 318, the HLC 112 may be configured to report that the new MAP controller exists, assuming remote management is available and reporting of this condition is desired. In one embodiment, the reporting may include information on the new MAP controller, including, but not limited to, an abstraction layer (AL) media access control (MAC) address of the new MAP controller. In one embodiment, the remote management server (also referred to as a remote management system) may decide which MAP controller should be enabled and which should be disabled, and may execute the decision via remote management configuration. However, in one embodiment, the new MAP controller may have been introduced by the user as a retail device, keeping it out of operator control.

At step 320, the HLC 112 may collect network topology information from the MAP agent 110. In one embodiment, the HLC 112 may collect network topology information as new information about the wireless network is discovered and/or changed. In another embodiment, the HLC 112 may proactively probe the wireless network to collect network topology information. In one embodiment, the MAP agent 110, similarly to the existing MAP controller 108, may comprise a 1905.1 management entity with a separate AL MAC address. In one embodiment, the MAP agent 110 may conduct Topology messaging in order to share and learn about network topology information.

At step 322, the HLC 112 may determine if other MAP controllers from the existing MAP controller 108, such as the new MAP controller, exist elsewhere in the wireless network. In response to the HLC 112 determining that another MAP controller exists elsewhere in the wireless network, the HLC 112 may continue to collect network topology information from the MAP agent 110 at step 320. In response to the HLC 112 determining that no other MAP controllers exist elsewhere in the wireless network, the HLC 112 may re-enable the existing MAP controller 108 in the existing MAP controller device 102 at step 324.

In one embodiment, at step 326, the HLC 112 may be configured to report that the no other MAP controllers exist, assuming remote management is available and reporting of this condition is desired. In one embodiment, the reporting may include information on the existing MAP controller 108, including, but not limited to, an AL MAC address of the existing MAP controller 108.

At step 328, the HLC 112 may stop collecting network topology information from the MAP agent 110. The HLC 112 may then return to step 312 to collect network topology information from the existing MAP controller 108.

In one embodiment, the HLC 112 may not disable the existing MAP controller 108 in response to determining that another MAP controller exists in the wireless network. The existing MAP controller 108 may be reconfigured to disable all of its MAP controller functionality except for the 1905.1 management entity. As a result, the HLC 112 would not need to switch to collecting to network topology information from the MAP agent 110.

Exemplary Method for Multi-MAP Controller Discovery and Resolution

Figure 4:
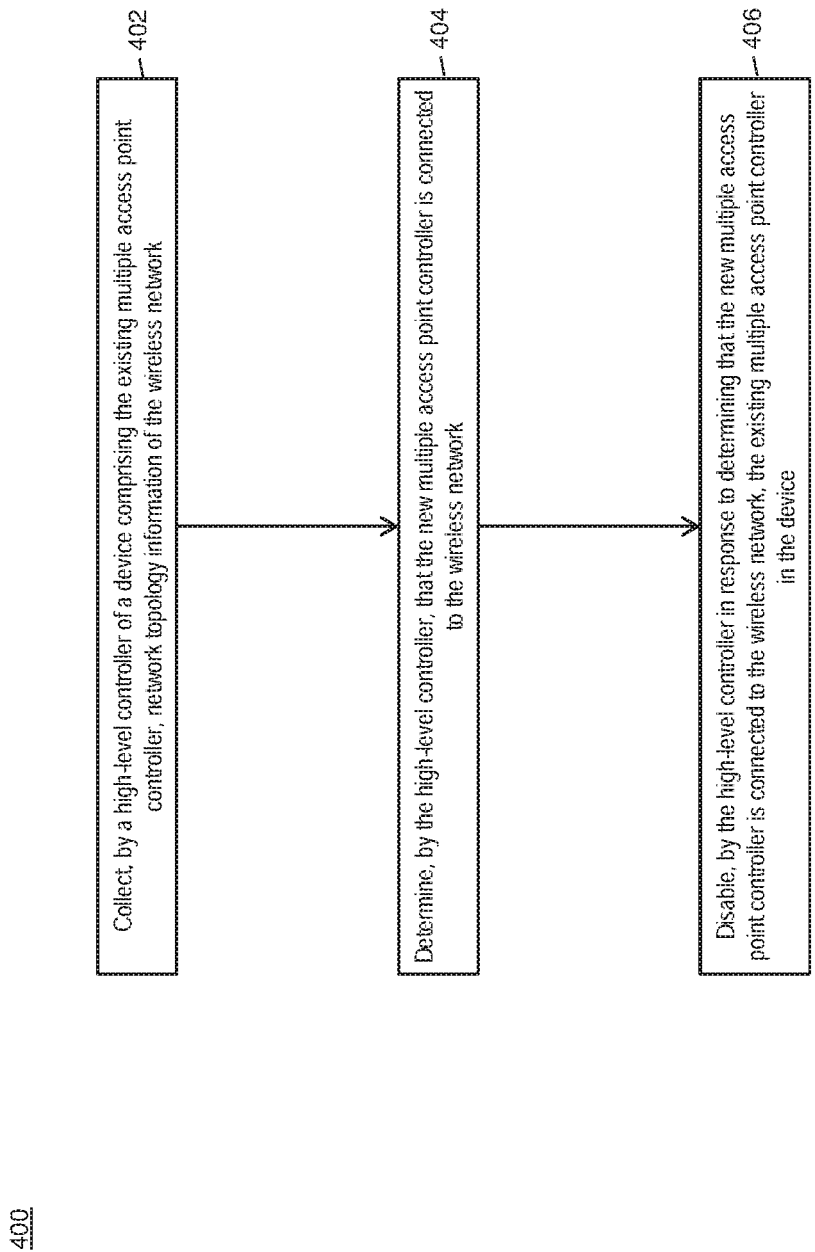
FIG. 4 is a flow chart illustrating an exemplary method for multi-MAP controller discovery and resolution in accordance with exemplary embodiments.

Referring now to FIG. 4, a method 400 for multi-MAP controller discovery and resolution in a wireless network is discussed further. In step 402, an HLC, such as the HLC 112 of FIG. 1, of a device comprising an existing MAP controller 108, such as the existing MAP collector device 102 of FIG. 1, may collect network topology information of the wireless network.

In step 404, the HLC 112, may determine that a new MAP controller is connected to the wireless network. In step 406, the HLC 112, in response to determining that the new MAP controller is connected to the wireless network, may disable the existing MAP controller 108 in the existing MAP controller device 102.

In some embodiments, the HLC 112 may be configured to report to a remote management system that the existing MAP controller 108 has been disabled. In some embodiments, the report that the existing MAP controller 108 has been disabled may comprise an abstraction layer media access control (MAC) address of the new MAP controller.

In some embodiments, the HLC 112 may be further configured to collect network topology information of the wireless network from a MAP agent 110 of the existing MAP controller device 102, determine that the new MAP controller is no longer connected to the wireless network, and re-enabling the existing MAP controller 108 in the existing MAP controller device 102.

In some embodiment, the HLC 112 is further configured to report to the remote management system that the existing MAP controller 108 has been re-enabled. In some embodiments, the report that the existing MAP controller 108 has been re-enabled may comprise an abstraction layer MAC address of the existing MAP controller 108.

In some embodiments, the HLC 112 may be further configured to receive, from the remote management system, a decision to disable either the new MAP controller or the existing MAP controller 108. In some embodiments, the disabling the existing MAP controller 108 in the existing MAP controller device 102 in response to determining that the new MAP controller is connected to the wireless network may comprise disabling the existing MAP controller 108 in the existing MAP controller device 102 in response to determining that the new MAP controller is connected to the wireless network and in response to receiving the decision to disable the existing MAP controller 108.

In some embodiments, the new MAP controller may comprise at least two new MAP controllers. The receiving the decision to disable either the new MAP controller or the existing MAP controller 108 may comprise receiving the decision to disable either the existing MAP controller 108 or one of the at least two new MAP controllers.

Computer System Architecture

Figure 5:
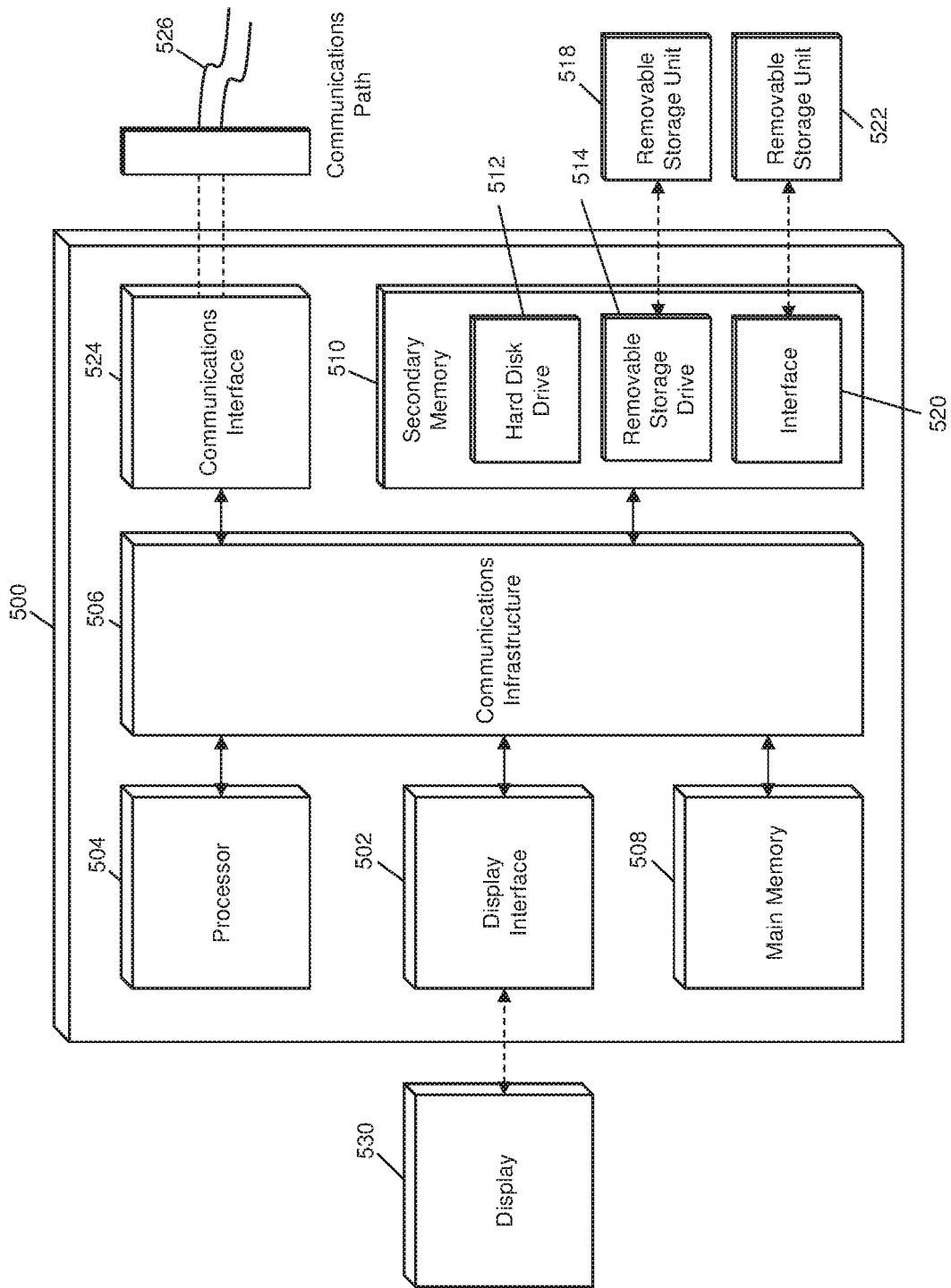
FIG. 5 is a block diagram illustrating a computer system architecture in accordance with exemplary embodiments.

Referring now to FIG. 5, a computer system 500 in which embodiments of the present disclosure, or portions thereof, may be implemented as computer-readable code is discussed further. For example, the existing MAP controller device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special-purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local wireless network (LAN), a wide wireless network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, Wi-Fi, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for multi-MAP controller discovery and resolution in a wireless network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for discovering and resolving a new multiple access point (MAP) controller by an existing MAP controller in a wireless network, comprising:
   collecting, by a high-level controller (HLC) of a device comprising the existing MAP controller, network topology information of the wireless network from the existing MAP controller;

determining, by the HLC, that the new MAP controller is connected to the wireless network; and disabling, by the HLC in response to determining that the new MAP controller is connected to the wireless network, the existing MAP controller.

2. The method according to claim 1, wherein the HLC is configured to report to a remote management system that the existing MAP controller has been disabled.

3. The method according to claim 2, wherein the report that the existing MAP controller has been disabled comprises an abstraction layer media access control address of the new MAP controller.

4. The method according to claim 1, further comprising:
collecting, by the HLC, network topology information of the wireless network from a MAP agent of the device;
determining, by the HLC, that the new MAP controller is no longer connected to the wireless network; and
re-enabling, by the HLC, the existing MAP controller in the device.

5. The method according to claim 4, wherein the HLC is configured to report to a remote management system that the existing MAP controller has been re-enabled.

6. The method according to claim 5, wherein the report that the existing MAP controller has been re-enabled comprises an abstraction layer media access control address of the existing MAP controller.

7. The method according to claim 1, further comprising:
receiving, by the HLC from a remote management system, a decision to disable either the new MAP controller or the existing MAP controller,
wherein the disabling the existing MAP controller in the device in response to determining that the new MAP controller is connected to the wireless network comprises disabling the existing MAP controller in the device in response to determining that the new MAP controller is connected to the wireless network and in response to receiving the decision to disable the existing MAP controller.

8. The method according to claim 7, wherein the new MAP controller comprises at least two new MAP controllers, and wherein the receiving the decision to disable either the new MAP controller or the existing MAP controller comprises receiving the decision to disable either the existing MAP controller or one of the at least two new MAP controllers.

9. A system for discovering and resolving a new multiple access point (MAP) controller in a wireless network, comprising:
a plurality of user devices;
a plurality of MAP devices electronically coupled to the plurality of user devices;
an existing MAP controller disposed in at least one of the plurality of MAP devices; and
a high-level controller (HLC) disposed in the at least one of the plurality of MAP devices comprising the existing MAP controller, the HLC being configured to:
collect network topology information of the wireless network from the existing MAP controller;
determine that the new MAP controller is connected to the wireless network; and
disable, in response to determining that the new MAP controller is connected to the wireless network, the existing MAP controller.

10. The system according to claim 9, wherein the HLC is further configured to report to a remote management system that the existing MAP controller has been disabled.

11. The system according to claim 10, wherein the report that the existing MAP controller has been disabled comprises an abstraction layer media access control address of the new MAP controller.

12. The system according to claim 9, wherein the HLC is further configured to:
collect network topology information of the wireless network from a MAP agent of the system;
determine that the new MAP controller is no longer connected to the wireless network; and
re-enable the existing MAP controller in the system.

13. The system according to claim 12, wherein the HLC is further configured to report to a remote management system that the existing MAP controller has been re-enabled.

14. The system according to claim 13, wherein the report that the existing MAP controller has been re-enabled comprises an abstraction layer media access control address of the existing MAP controller.

15. The system according to claim 9, wherein the HLC is further configured to:
receive, from a remote management system, a decision to disable either the new MAP controller or the existing MAP controller,
wherein the disabling the existing MAP controller in response to determining that the new MAP controller is connected to the wireless network comprises disabling the existing MAP controller in response to determining that the new MAP controller is connected to the wireless network and in response to receiving the decision to disable the existing MAP controller.

16. The system according to claim 15, wherein the new MAP controller comprises at least two new MAP controllers, and wherein the receiving the decision to disable either the new MAP controller or the existing MAP controller comprises receiving the decision to disable either the existing MAP controller or one of the at least two new MAP controllers.

17. One or more non-transitory computer readable media, comprising stored instructions which, when executed by one or more computer processors, cause the one or more computer processors to perform steps for discovering and resolving a new multiple access point (MAP) controller by an existing MAP controller in a wireless network, the steps comprising:
collecting, by a high-level controller (HLC) of a device comprising the existing MAP controller, network topology information of the wireless network from the existing MAP controller;
determining, by the HLC, that the new MAP controller is connected to the wireless network; and
disabling, by the HLC in response to determining that the new MAP controller is connected to the wireless network, the existing MAP controller.

18. The non-transitory computer readable media according to claim 17, wherein the HLC is configured to report to a remote management system that the existing MAP controller has been disabled.

19. The non-transitory computer readable media according to claim 17, the steps further comprising:
collecting, by the HLC, network topology information of the wireless network from a MAP agent of the device;
determining, by the HLC, that the new MAP controller is no longer connected to the wireless network; and
re-enabling, by the HLC, the existing MAP controller in the device.

20. The non-transitory computer readable media according to claim 17, the steps further comprising:

receiving, by the HLC from a remote management system, a decision to disable either the new MAP controller or the existing MAP controller,
wherein the disabling the existing MAP controller in the device in response to determining that the new MAP controller is connected to the wireless network comprises disabling the existing MAP controller in the device in response to determining that the new MAP controller is connected to the wireless network and in response to receiving the decision to disable the existing MAP controller.

* * * * *